Figure 1:
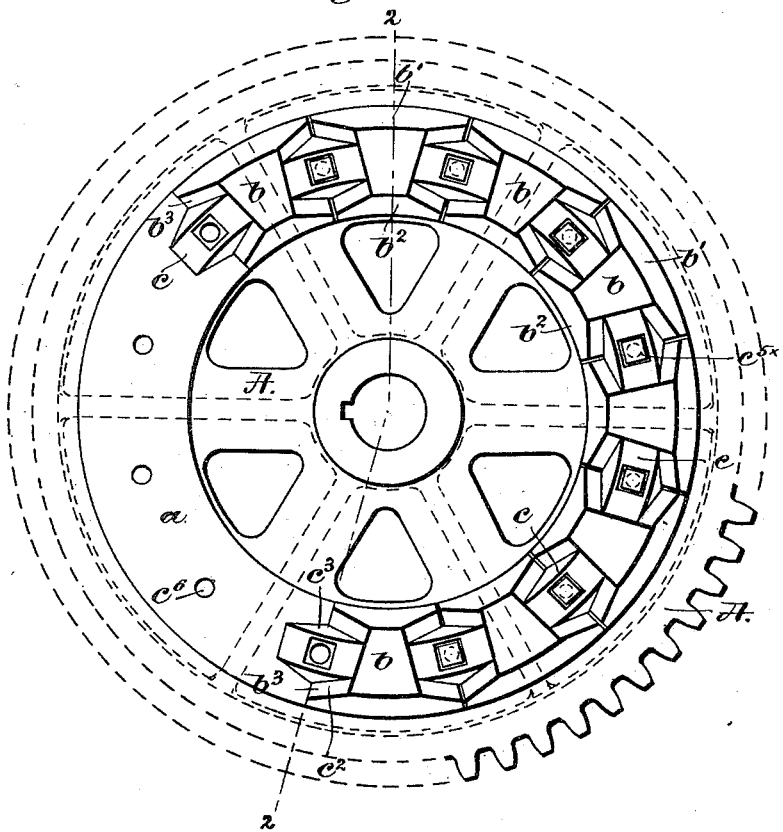

No. 697,271. Patented Apr. 8, 1902.
A. E. NORRIS.
FRICTION CLUTCH.
(Application filed Oct. 16, 1901.)

(No Model.)

Witnesses.

Inventor,
Atmon E. Norris,
by Frederick L. Emery
Atty.

THE NORRIS PETERS CO., PHOTO-LITHO., WASHINGTON, D. C.

UNITED STATES PATENT OFFICE.

ALMON E. NORRIS, OF CAMBRIDGEPORT, MASSACHUSETTS.

FRICTION-CLUTCH.

SPECIFICATION forming part of Letters Patent No. 697,271, dated April 8, 1902.

Application filed October 16, 1901. Serial No. 78,788. (No model.)

*To all whom it may concern:*

Be it known that I, ALMON E. NORRIS, a citizen of the United States, residing at Cambridgeport, in the county of Middlesex and State of Massachusetts, have invented an Improvement in Friction-Clutches, of which the following description, in connection with the accompanying drawings, is a specification, like letters on the drawings representing like parts.

This invention relates to friction-clutches and particularly to a rotary wheel or member forming a part of a friction-clutch.

In the manufacture of rotary members or wheels for friction-clutches it has heretofore been common to apply to one of the side faces of such wheel or member a series of friction-blocks, usually of wood, made with tapering or inclined outer and inner faces, said blocks being circularly arranged to present, in effect, a friction ring or flange having tapering outer and inner faces adapted to be pressed into frictional engagement with the correspondingly tapered or inclined walls of a friction-groove in a coöperating member or drum. In constructions of this type it has been common to secure these friction-blocks in the grooved face of the wheel by means of bolts having tapering heads engaging tapering walls or recesses formed in the adjacent ends of the blocks, said bolts through their said tapering heads acting to wedge or confine the said blocks in the said grooved face and against movement therein. The friction-blocks have been thus arranged in a grooved channel in the face of the wheel. In the use of friction drums or clutches of this type repeated applications of the friction frequently cause heating of the drum or other metallic face in which the friction-groove is formed, and this heating of the grooved face causes the diameter of the groove therein to vary more or less from time to time, and in the event of the opposed or wooden blocks being confined against radial movement such change in diameter of the friction-groove causes imperfect application of the friction. For instance, if the grooved drum-head becomes heated and expands, thereby enlarging the diameter of the groove therein, the inner face only of said groove will, on application of the friction, contact with the inner faces only of the friction-blocks, the outer faces of the grooves and blocks failing utterly to frictionally engage each other, thus reducing the frictional engagement by one-half and correspondingly reducing the effectiveness of the clutch.

To overcome this, one feature of my invention consists in mounting the frictional or wooden blocks upon the face of the carrying-wheel in such a manner as to permit said blocks to "go and come" or shift radially, as may be necessary to accommodate themselves to the changing diameter of the opposed grooved friction-face. This makes it necessary so to construct the clamping means for securing said blocks upon the wheel-face as to provide the necessary firmness of clamping without any tendency to separate said radially-movable blocks, which would result in an enlargement of the diameter of the series. Consequently my invention comprehends the formation of the friction-blocks with adjacent inclined or wedge faces having an inclination of forty-five degrees each, forming an angle between them of ninety degrees, and employing holding means having the same angular faces, whereby I may obtain the highest clamping effect without any appreciable tendency to separate the blocks.

The foregoing, with other features of my invention, will be more fully hereinafter explained in connection with the accompanying drawings, and particularly pointed out in the claims at the end of this specification.

Figure 2:
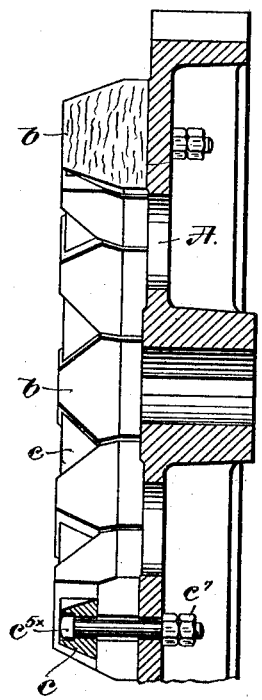
Figure 4:
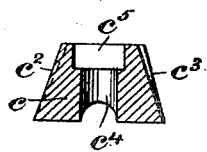
Figure 3:
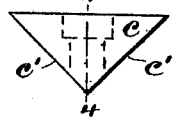

In the drawings, Figure 1, in front elevation, shows a friction member or wheel made in accordance with my invention; Fig. 2, a vertical section on the irregular dotted line 2 2, Fig. 1; Fig. 3, a side view of one of the holding members; Fig. 4, a cross-section on the dotted line 4 4, Fig. 3; and Fig. 5, a view showing one of the friction-blocks detached.

In the particular embodiment of my invention selected for illustration herein and shown in the drawings, A is a toothed wheel of suitable size and construction, such as ordinarily employed in connection with friction devices of the class to which my invention relates.

Figure 5:
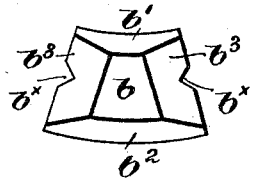

At one side of the wheel A there is formed a flat face $a$, to which are applied in a circular series the friction-blocks $b\ b$, one of which is shown separately in Fig. 5. These blocks are formed, as shown, to present outer and inner inclined friction-faces $b'$ $b^2$ and inclined end holding-faces $b^3$. The grain of the blocks preferably is radial with reference to the axis of the wheel to which they are applied—that is, the grain is substantially perpendicular to the outer and inner faces $b'$ $b^2$, so that the end of the grain is exposed at each of said faces.

When applied as in Fig. 1, the several blocks form a circular series, with their outer and inner faces $b'$ $b^2$ forming in circular series outer and inner inclined wedge-faces to coöperate with the correspondingly-inclined faces of the groove upon the opposed friction member. (Not herein shown.)

The inclined holding-faces $b^3$ of the friction-blocks $b$ stand at an angle of forty-five degrees with the plane of the bases of said blocks, so that there is formed between each two adjacent blocks a radial wedge-shaped opening or recess, the walls of which stand at an angle of ninety degrees relative to each other. Each of these radial openings or recesses receives a holding member $c$, (shown in Figs. 3 and 4,) having end faces $e'$, inclined at the same angle as the holding-faces $b^3$ of the block $b$, the said holding members $c$ having their outer and inner faces $c^2$ $c^3$ also inclined parallel to the inclination of the outer and inner faces of the friction-blocks $b$, although the said holding members $c$ are somewhat narrower from their outer to their inner faces to insure contact of the friction-faces only with the walls of the opposed groove, particularly as the said friction-blocks wear away under repeated operations of the clutch.

The holding members $c$ may be drawn toward the face of the carrying-wheel to confine the friction-blocks in position in any suitable or desired manner. I have herein shown said holding members as provided with holes $c^4$, countersunk at $c^5$ to receive the clamping members, shown as headed bolts $c^{5\times}$, which extend inward through openings $c^6$ in the face of said wheel and receive at the opposite side of said wheel one or more nuts $c^7$, by means of which said bolts and holding members may be drawn toward the wheel to tightly and frictionally hold the friction-blocks in position. The adjacent ends of the friction-blocks $b$ are cut away, as at $b^\times$, for the passage of the bolts $c^5$, and as accuracy of fit at this point is not required the recesses $b^\times$ may be formed by sawing into the edge of the block in two directions to remove a V-shaped piece therefrom. The openings $c^6$, through which the bolts $c^5$ pass, are shown as somewhat larger in diameter than the bolts to permit a certain radial movement of the latter, as will be described.

By making the adjacent holding-faces of the friction-blocks at an angle of forty-five degrees with the bases of said blocks and by making the faces $c'$ of the holding members at an angle of ninety degrees with each other I am enabled to draw said holding members inward toward the face of the carrying-wheel with whatever force is necessary to hold said blocks firmly in position, yet without danger of moving said blocks sidewise, which would tend to enlarge the circumference of the series. In other words, I have found that an angle of less than ninety degrees between the clamping-faces of the holding members and friction-blocks tends to move the blocks sidewise and enlarge the series and that an angle of more than ninety degrees between said faces, while obviating the tendency to enlarge the diameter of the series, would reduce the effectiveness of the clamping of the blocks upon the wheel. By forming the said faces at an angle of ninety degrees from each other I am enabled to obtain the highest clamping effect to hold the blocks to the wheel without any appreciable tendency to enlarge the series.

When the wheel is in use, should the opposed grooved member become heated and enlarge the diameter of its clamping friction-groove the friction-blocks $b$, being confined upon the wheel by friction only, are free to go and come or move radially to accommodate the change in diameter of the opposed friction-groove, thus preserving the necessary contact of the outer and inner friction-faces of the blocks with the outer and inner friction-faces of the opposed groove. To permit of this movement of the blocks, the latter, as here shown, are clamped on a flat face of the carrying-wheel instead of a groove in said wheel, and, furthermore, the openings $c^6$ are larger than the bolts $c^{5\times}$, passed through the same, to permit of a certain movement of said bolts as may be necessary to permit required movements of the friction-blocks. In other words, the construction is such throughout as to provide the necessary give to insure always a proper contact of both friction-faces of the blocks with both friction-faces of the opposed groove as the diameter of the latter changes; yet at all times the holding friction is sufficient to keep the blocks in their proper positions upon the wheel.

Having described one embodiment of my invention and without limiting myself in the matter of details, what I claim, and desire to secure by Letters Patent, is—

1. A friction member comprising a wheel having a flat face, a circularly-arranged series of radially-movable friction-blocks applied thereon, said blocks having outer and inner inclined friction-faces, the adjacent ends of said blocks being inclined toward each other, wedge-shaped holding members arranged between adjacent blocks, with means to clamp said holding members to said wheel.

2. A friction member comprising a wheel having a flat face, a circularly-arranged series of radially-movable friction-blocks applied thereon, said blocks having outer and inner inclined friction-faces, the adjacent ends of said blocks being inclined toward each other, wedge-shaped holding members arranged between adjacent blocks, with means to clamp said holding members to said wheel, the wedge-faces of said holding members and adjacent ends of said blocks standing respectively at an angle of ninety degrees from each other whereby is obtained the highest clamping efficiency without appreciable tendency to separate said blocks.

3. A friction member comprising a wheel having a flat face, a circularly-arranged series of friction-blocks applied to said flat face and having outer and inner inclined friction-faces, the adjacent ends of said blocks being notched and inclined toward each other, wedge-shaped holding members arranged between adjacent blocks and clamping devices passing through the recesses formed by the adjacent notched ends of said blocks to clamp said holding members to said wheel.

4. A friction member comprising a wheel, a circularly-arranged series of friction-blocks applied to one of the faces of said wheel and having outer and inner inclined friction-faces, said blocks having the capacity to move radially on said wheel, and means to secure said blocks to said wheel while permitting said radial movement.

5. A friction member comprising a wheel having a flat face, a circularly-arranged series of friction-blocks applied to said face and having outer and inclined friction-faces, said blocks having wedge-shaped ends, wedge-shaped holding members arranged between said blocks, and clamping-bolts for said holding members extended inward through openings in said wheel-face, said openings being larger in diameter than said bolts to permit the radial movement of the latter as said blocks go and come.

6. A friction member comprising a wheel, a circularly-arranged series of friction-blocks applied to one of the faces of said wheel, each block having an outer and an inner inclined friction-face and each block being arranged with its grain radial, that is, exposed at its outer and inner friction-faces, said blocks being free to move radially on said wheel, and means to clamp said blocks upon said wheel while preserving the capacity of said blocks to move radially.

In testimony whereof I have signed my name to this specification in the presence of two subscribing witnesses.

ALMON E. NORRIS.

Witnesses:
FREDERICK L. EMERY,
EVERETT S. EMERY.